July 2, 1929.  G. SIPP  1,719,565
BEAMING MACHINE
Filed Nov. 6, 1928   2 Sheets-Sheet 1
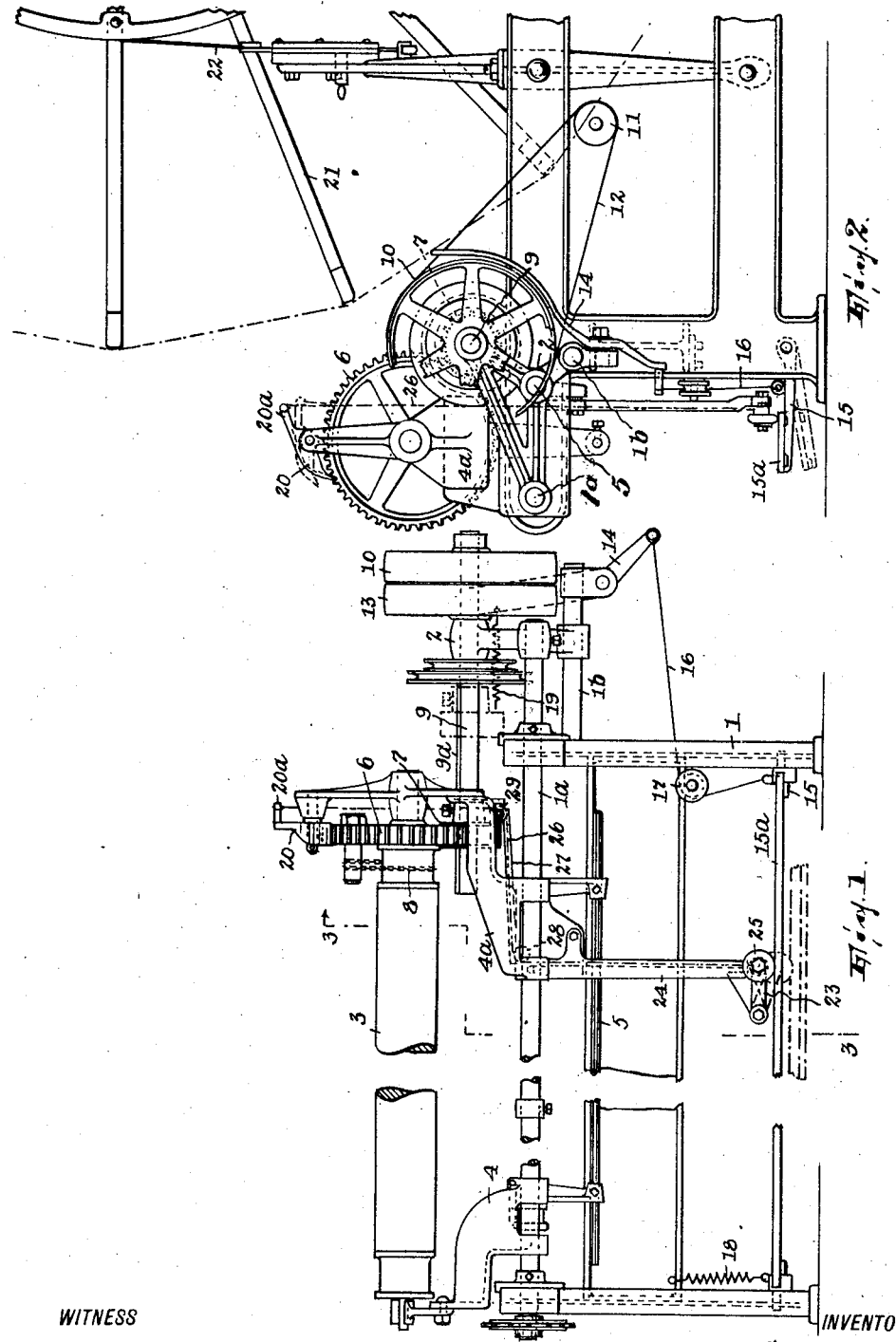
WITNESS
INVENTOR,
Grant Sipp,
BY
ATTORNEY.

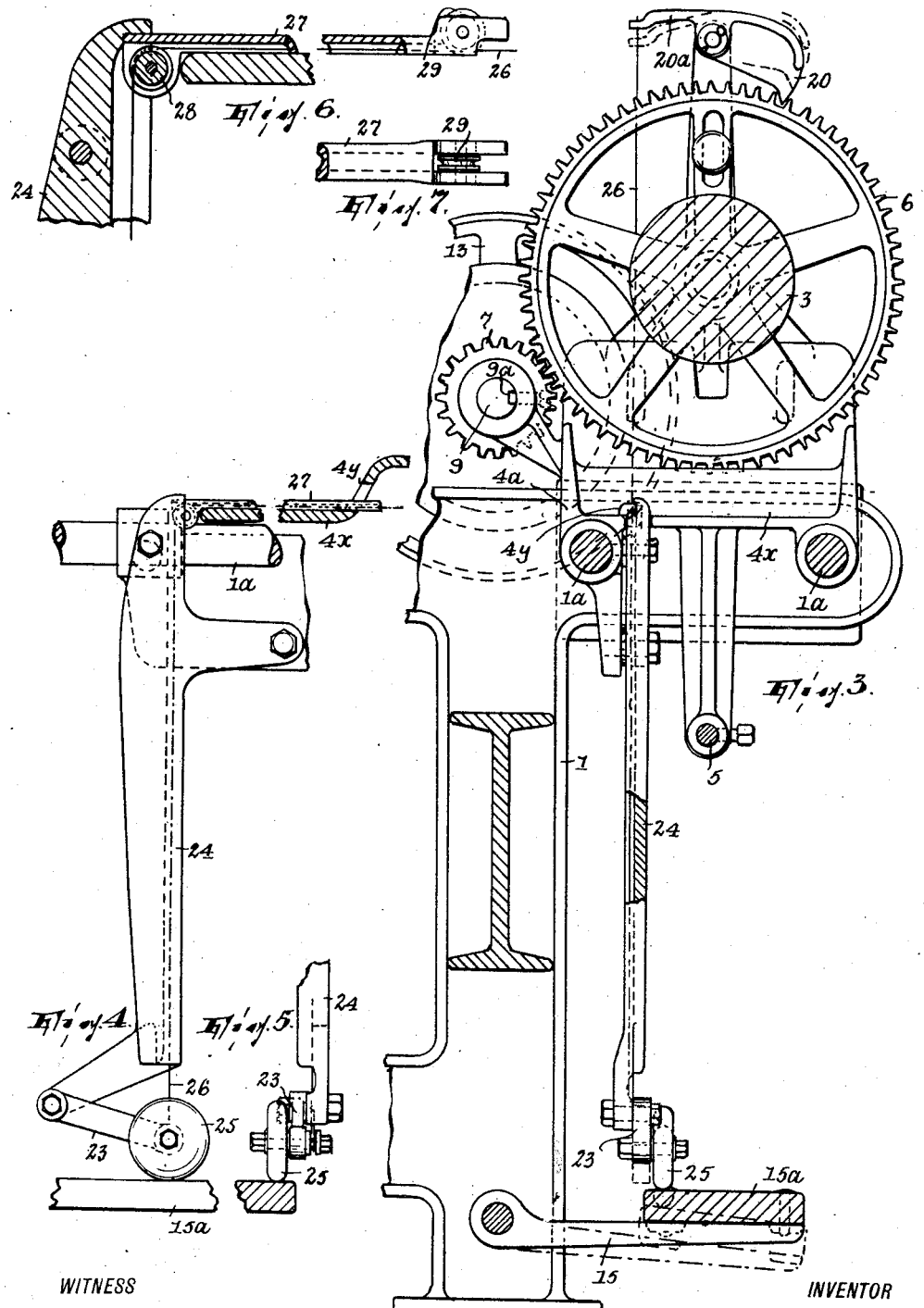

Patented July 2, 1929.

1,719,565

UNITED STATES PATENT OFFICE.

GRANT SIPP, OF PATERSON, NEW JERSEY.

BEAMING MACHINE.

Application filed November 6, 1928. Serial No. 317,645.

In machines for beaming warps the rotary driven means with which the beam is coupled has a member thereof toothed and with the teeth of such member a holding pawl engages which, when the operator stops the driving action, as by shifting a belt or other movable means to apply the power to or cut off the power from said driven means, serves to prevent backward rotation of the beam and consequent slackening of the warp between the beam and the (usually braked) reel from which the warp is unwound. According to this invention the pawl is connected with the said movable means in such manner that when the said means is moved to apply the power the pawl will be retracted, thus to avoid the monotonous and hence objectionable clicking sound of the pawl as it rides the teeth of said member, the pawl being allowed to assume its normal or working relation to said toothed member when said means thereupon is moved to the position for cutting off the power. Usually the driven means comprises two parts as to which one, due to a spline connection, is shiftable for certain purposes, together with the pawl, lengthwise of the axis of the beam and the said movable means includes an actuator in the form of a treadle extending parallel with the axis of the beam. The invention, where these conditions exist, contemplates obtaining the retraction of the pawl from this actuator, and takes into account the shiftability of said part and pawl relatively to the actuator.

In the drawings,

Fig. 1 is a front elevation of so much of a beaming machine, including the present improvements, as is necessary for the purposes in hand;

Fig. 2 is a side elevation of what is shown in Fig. 1, a fragment of the reel and its brakeing means also appearing;

Fig. 3 is a section on line 3—3, Fig. 1;

Fig. 4 is a front elevation on a larger scale of certain parts appearing in the first two figures;

Fig. 5 is a side elevation of certain parts at the lower portion of Fig. 4;

Fig. 6 a view in vertical section of certain parts at the upper portion of Fig. 4; and Fig. 7 a fragmentary plan of certain parts appearing in Fig. 6.

1 is the frame including a pair of horizontal bars $1^a$ and a third bar $1^b$ and a bracket 2 fixed on these bars. 3 is the beam journaled at its left-hand end in one of two brackets 4, $4^a$ (which are shiftable along bars $1^a$ to or from each other or together and are connected by a bar 5 and thus form the beam-carriage) and having its right-hand end carried by the driven means. The driven means here includes the intermeshing gear 6 and pinion 7 (the former of which is the part carrying the right-hand end of the beam, to which it is lashed by the means 8), the shaft 9 journaled in bracket 2, and the fast pulley 10 on said shaft, the shaft being held against longitudinal shifting in bracket 2 whereas the gear and pinion are shiftable lengthwise of said shaft and with bracket $4^a$ (to wit, if the carriage as a whole is thus shifted or said bracket is thus shifted to or from bracket 4); the connection between the shaft and the pinion (carried thereby) is a spline $9^a$. The means to apply or cut off the power, which is here derived from a going pulley 11, is a belt 12 which may run idly on a free pulley 13 on shaft 9 and is shiftable onto pulley 10, a shifter 14 for the belt, a treadle lever (actuator) 15 having its axis and its treadle $15^a$ parallel with the beam and a flexible connection 16 which extends from the shifter to the treadle lever around sheave 17, 18 and 19 being springs acting (respectively on the treadle lever and shifter) to hold said means in the position where the belt is on the free pulley. 20 is the holding pawl normally (by gravity) held engaged with the teeth of gear 6, being pivoted on bracket $4^a$. 21 is the reel and 22 its braking means. So much is known.

The means to apply or cut off the power is made, according to my invention as stated, to actuate the pawl to retract it from the gear when the treadle lever is depressed to effect the coupling and start the beam rotating to wind thereon the warp. Thus, a shoe by its weight rests on the treadle and inasmuch as it moves up and down therewith it is, to all intents and purposes, a part of the said means; this shoe comprises an arm 23 pivoted in a depending leg 24 of the bracket $4^a$ of the carriage and a roller 25 journaled in the arm on a horizontal axis transverse of the treadle. Connecting the (arm of the) shoe with an arm $20^a$ of the pawl is a flexible connection 26. Whenever the treadle lever is depressed to apply the power to the driven means it will be apparent that the means therefor, as thus organized, will elevate the pawl clear of the teeth of the gear, allowing it, however, to return to hold the gear and hence the beam against any back-lash on the ensuing rise of the treadle lever. The construction and arrangement are moreover such that the means to apply and cut off the power remains operative on the pawl in this way wherever the bracket, and hence the part 6—7 of the driven means and the pawl, happen to be set in their range of shifting lengthwise of the axis of the beam.

Describing certain parts of the mechanism shown more particularly: Leg 24 is bolted to bracket 4ᵃ and projects above its table 4ˣ which has its right-hand edge portion upturned as shown in Figs. 3 and 4 and in such portion has an opening 4ʸ. An elongated piece 27, grooved at the under side and forked at both ends, rests on the table and pentrates said opening and has in its forks the grooved sheaves 28 and 29, one fork depending and being engaged with the left-hand edge of the table and the other bearing upwardly against the bracket. The connection 26 extends over sheave 28 and then under sheave 29 to the pawl. The piece 27 and its sheaves simply form an adapter for the bracket 4ᵃ whereby it will serve for the anti-friction guiding of the connection 26.

In the preferred construction (as shown) the member 23—25 is carried by and thus confined to shift with the carriage section or bracket 4ᵃ, to wit, by being mounted in its depending leg 24. With the member 23—25 thus confined to shift with the said carriage section the shifting of said member along the treadle lever is an automatic incident of the shifting of said section, in consonance therewith.

Having thus fully described my invention, what I claim is:

1. A beaming mechanism comprising a supporting structure, rotary beam-driving driven means including a rotary toothed member, a holding pawl normally urged into engagement with the toothed member, and means movable to apply driving power to said driven means and simultaneously retract the pawl from said member.

2. A beaming mechanism comprising a supporting structure, rotary beam-driving driven means having a part thereof shiftable rectilineally and including a rotary toothed member, a holding pawl normally urged into engagement with the toothed member and shiftable with said part, and means movable to apply driving power to said driven means and simultaneously retract the pawl from said member.

3. A beaming mechanism comprising a supporting structure, rotary beam-driving means having a part thereof arranged with its axis horizontal and shiftable lengthwise of said axis and including a rotary toothed member, a holding pawl normally urged into engagement with the toothed member and shiftable with said part, a downwardly movable treadle having a supporting surface extending substantially parallel with said axis, a gravity-actuated member resting on said surface and shiftable along the same with the pawl, and a connection to transmit retracting movement to the pawl when said member descends with the treadle.

4. A beaming mechanism comprising a frame, a carriage section shiftable horizontally thereon, rotary beam-driving means having a part thereof journaled in and shiftable with said section and including a rotary toothed member, a holding pawl movable on and shiftable with said section and normally urged into engagement with the toothed member, a downwardly movable treadle having a supporting surface extending substantially parallel with the path of shifting of said section, a gravity actuated member movable in and shiftable with said section and resting on said surface, and a connection to transmit retracting movement to the pawl when said member descends with the treadle.

In testimony whereof I affix my signature.

GRANT SIPP.